(12) United States Patent
Otsuka et al.

(10) Patent No.: US 8,546,029 B2
(45) Date of Patent: Oct. 1, 2013

(54) SOLID OXIDE FUEL CELL

(75) Inventors: Toshiharu Otsuka, Kitakyushu (JP);
Katsuhisa Tsuchiya, Kitakyushu (JP);
Tsukasa Shigezumi, Kitakyushu (JP);
Toshiharu Ooe, Kitakyushu (JP);
Kiyotaka Nakano, Kitakyushu (JP);
Takuya Matsuo, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 445 days.

(21) Appl. No.: 13/040,884

(22) Filed: Mar. 4, 2011

(65) Prior Publication Data

US 2011/0217603 A1   Sep. 8, 2011

(30) Foreign Application Priority Data

Mar. 5, 2010   (JP) .................................. 2010-48936

(51) Int. Cl.
*H01M 8/06*   (2006.01)
(52) U.S. Cl.
USPC ......................................... 429/413; 429/423
(58) Field of Classification Search
USPC .................................................. 429/413, 423
See application file for complete search history.

(56) References Cited

U.S. PATENT DOCUMENTS

| | | | |
|---|---|---|---|
| 6,638,652 B1 | 10/2003 | Motozono et al. | |
| 2001/0014414 A1* | 8/2001 | Okamoto et al. | 429/20 |
| 2001/0026777 A1 | 10/2001 | Negishi et al. | |
| 2010/0304237 A1* | 12/2010 | Ishida | 429/423 |
| 2011/0053017 A1* | 3/2011 | Takahashi | 429/423 |

FOREIGN PATENT DOCUMENTS

| | | |
|---|---|---|
| EP | 2154107 A1 | 2/2010 |
| JP | 2000-109301 A | 4/2000 |
| JP | 2001-229941 A | 8/2001 |
| JP | 2001-335301 A | 12/2001 |
| JP | 2005-243248 A | 9/2005 |
| JP | 2008-053209 A | 3/2008 |
| JP | 2009-196834 A | 9/2009 |
| WO | WO 2009/028427 A1 | 3/2009 |

OTHER PUBLICATIONS

Extended European Search Report for European Application No. 11156975.2, dated May 19, 2011, 6 pages.

* cited by examiner

*Primary Examiner* — Patrick Joseph Ryan
*Assistant Examiner* — Muhammad Siddiquee
(74) *Attorney, Agent, or Firm* — Brinks Hofer Gilson & Lione

(57) ABSTRACT

To provide a solid oxide fuel cell in which the reformer is compact but is capable of supplying an appropriate quantity of fuel. The present invention is a solid oxide fuel cell (1) for generating electricity using fuel reformed by a reformer (20) and air, including a fuel supply means (38), a reformed air supply means (44), a water supply means (28) for supplying water to the reformer, a fuel supply quantity detection sensor (132) for detecting the quantity of fuel actually supplied, a fuel cell module (2), and a control means (110) for controlling each supply means so that the target quantities of fuel, reforming air, and water are fed into the reformer; the control means controls the fuel supply means to match the target fuel supply quantity, and controls the fuel supply means so that tracking performance of fuel supply quantity relative to target fuel supply quantity is higher when reforming air is being supplied to the reformer than when it is not being supplied.

3 Claims, 11 Drawing Sheets

SOLID OXIDE FUEL CELL

RELATED APPLICATIONS

This application claims priority under 35 U.S.C. §119 to Japanese Patent Application No. 2010-048936 filed on Mar. 5, 2010, the entire content of which is hereby incorporated by reference.

BACKGROUND OF THE INVENTION

1. Field of the Invention

The present invention relates to a solid oxide fuel cell, and more particularly to a solid oxide fuel cell for generating electricity by reacting fuel gas, reformed by a reformer, with air.

2. Description of the Related Art

In recent years various fuel cell devices fitted with fuel cells capable of generating electricity using fuel (hydrogen gas) and air, along with ancillary equipment for operating such fuel cells, have been proposed as next-generation energy sources.

Published Unexamined Application 2008-53209 (Patent Document 1) sets forth a fuel cell device for the steam reforming of fuel using a reformer, and for generating electricity using the steam gas thus obtained.

Prior Art References—Patent References: Patent Document 1: Published Unexamined Application 2008-53209.

As further detailed below, when a fuel cell device starts up, fuel and reforming air are first supplied into a reformer to conduct a partial oxidation reforming reaction (POX), fuel gas, reforming air, and water (pure water) are then supplied into the reformer, and an auto-thermal reforming reaction (ATR) proceeds, co-utilizing a partial oxidation reforming reaction (POX) and a steam reforming reaction (SR), described below; subsequently, fuel gas and water (pure water) are supplied into the reformer to conduct a steam reforming reaction (SR).

Within the fuel cell device, when the partial oxidation reforming reaction (POX) and auto-thermal reforming reaction (ATR) are implemented, reforming air is supplied to the reformer as fuel gas is supplied to the reformer.

At this point, the amount of fuel actually introduced into the reformer fluctuates depending on the pressure inside the reformer, even if the fuel supply device supplying fuel gas to the reformer is controlled at a fixed level. In a state whereby air is being introduced together with fuel gas into the reformer, the pressure inside the reformer rises as a result of the introduction of that air, making it difficult to introduce fuel gas into the reformer. This poses the problem that the targeted amount of fuel required to establish an appropriate level of reforming within the reformer may vary from the amount of fuel actually supplied. When the amount of fuel actually supplied varies from the target value, reforming air and fuel gas become unbalanced; carbon is deposited inside the reformer, and a dramatic speed up in the degradation of the reformer catalyst results.

It is possible to mitigate this type of pressure rise inside the reformer by increasing the volume of the reformer, but when the reformer increases in size it becomes difficult to heat uniformly, leading to thermal unevenness in the reformer. Enlarging the reformer also creates a further problem in that the overall size of the fuel cell device increases.

A more powerful fuel supply device for supplying fuel gas into the reformer could be used to reduce the effect of internal pressure within the reformer on fuel supply quantity, so that fuel gas could be fed in at a pressure which overcomes the pressure rise within the reformer, but increasing the power of the fuel supply device increases the size of the fuel supply device and raises cost.

The present invention was undertaken to resolve the above-described problems, and has the object of providing a solid oxide fuel cell capable of supplying an appropriate amount of fuel gas while achieving a smaller reformer size.

When conducting auto-thermal reforming reactions (ATR) and steam reforming reactions (SR) in a fuel cell device, water (pure water) must be supplied to the reformer as described above; in the ATR region, especially, where the amount of water supplied is extremely minute, only a very small amount of water, on the scale of a few milliliters per minute, must be continuously supplied. To precisely and stably supply such an extremely small amount of water requires the use of a specialized pump. The idea has been conceived of using a pulse pump to intermittently jet water under pulse control to supply such small amounts of water.

During steam reforming, however, the supplied water vaporizes inside the reformer, and the sudden increase in volume from that vaporization causes pressure fluctuations inside the reformer. Note that a vaporizer within the reformer vaporizes the supplied water, and fuel gas is reformed inside the reformer by the mixing of vaporized water and fuel gas. The vaporizer is here connected to the portion inside the reformer in which the reforming takes place, therefore the rising pressure within the vaporizer caused by the vaporization of water affects the entire reformer interior. The same phenomenon occurs even when the reformer and the vaporizer are constituted as separate entities.

A fuel-cell device is generally controlled so that the actual fuel supply quantity is measured and fed back to assure that the amount of fuel being supplied conforms to the target fuel supply quantity. If that feedback gain is raised simply to increase tracking performance relative to the targeted fuel supply quantity, the problem arises that fuel supply quantity rises and falls in an unstable manner in response to sudden pressure changes caused by the intermittent supply of water into the reformer In other words, immediately after a fuel supply quantity detection sensor detects a state in which the amount of fuel gas supplied is less than the target value when pressure is rising, a determination is made that there is insufficient fuel gas, and control is executed whereby additional fuel gas is supplied. In actuality however, the pressure drops in the next instant, making fuel gas easier to supply, so the above-described fuel insufficiency is additionally supplied although it is in fact unneeded, resulting in an oversupply of fuel gas.

The present invention has the object of providing a solid oxide fuel cell capable of supplying an appropriate amount of fuel gas in a stable manner even when pressure fluctuations occur within the reformer as the result of the above-described intermittent introduction of water.

SUMMARY OF THE INVENTION

In order to resolve the above-described problems, the present invention is a solid fuel cell device for generating electricity using air and reformed fuel reformed in a reformer, comprising a reformer for reforming fuel; a fuel supply means for supplying fuel to the reformer; a reforming air supply means for supplying reforming air to the reformer; a water supply means for supplying water to the reformer; a fuel supply quantity detection sensor for detecting the actual quantity of fuel supplied to the reformer by the fuel supply means; a fuel cell module for generating electricity using fuel reformed inside the reformer; and a control means for controlling the fuel supply means, the reforming air supply means, and the water supply means so that the target quantities of fuel, reforming air, and water are fed into the reformer; wherein the control means controls the fuel supply means so that the actual quantity of fuel supplied as detected by the fuel supply quantity detection sensor matches the target fuel supply quantity and, when reforming air is being supplied by the reforming air supply means to the reformer, the control means controls the fuel supply means so that the tracking performance of actual quantity of fuel supplied relative to target fuel supply quantity increases as the quantity of reforming air supplied increases.

In the present invention thus constituted, a control means controls the fuel supply means, the reforming air supply means, and the water supply means to supply fuel, reforming air, and water to the reformer. In addition, a fuel supply quantity detection sensor detects the amount of fuel actually supplied into the reformer, and the control means controls the fuel supply means so that the actual detected fuel supply quantity matches the target fuel supply quantity. This control means controls the fuel supply means so that the tracking performance of the actual fuel quantity supplied relative to the target fuel supply quantity is better when reforming air is being supplied to the reformer than when reforming air is not being supplied.

In the present invention thus constituted, fuel supply quantity tracking performance is improved when reforming air is supplied to the reformer. Therefore in the present invention, when pressure is raised by the introduction of reforming air so that the amount of fuel actually supplied into the reformer in which the introduction of fuel has been made more difficult quickly tracks the target amount of fuel to be supplied, thereby enabling the inflow of fuel into the reformer to be correctly controlled. On the other hand, in the region where no reforming air is being supplied, tracking performance can be reduced and the phenomenon of "hunting" which accompanies pressure variations can be avoided. This inhibits reformer degradation caused by the deposition of carbon and the like within the reformer.

In the present invention, the control means preferably controls the fuel supply means so that the tracking performance of actual quantity of fuel supplied relative to target fuel supply quantity increases as the supply of reforming air increases.

In the present invention thus constituted, fuel supply quantity tracking performance is improved more when a large amount of reforming air is being supplied to the reformer than when the amount of reforming air being supplied is small. As a result, fuel supply tracking performance can be precisely changed in response to the amount of reforming air introduced, thereby more precisely preventing fuel insufficiencies or oversupplies.

In the present invention there is preferably also a reformer pressure sensor for measuring the internal pressure of the reformer, and the control means controls the fuel supply means so that tracking performance of the actual fuel supply quantity relative to the target fuel supply quantity increases as the average internal pressure of the reformer as measured by the reformer pressure sensor increases.

In the present invention thus constituted, control of the fuel supply quantity is changed based on reformer internal pressure. As a result, in the present invention, fuel supply quantity tracking performance is further improved when average pressure inside the reformer is high. Average pressure inside the reformer is affected by the amount of reforming air introduced therein, and by clogging and the like caused by degradation of the reformer. The present invention enables the quantity of fuel supplied to be appropriately controlled in response to a rise in pressure within the reformer due to factors such as those described above.

In the present invention, the water supply means is preferably constituted to supply water intermittently to the reformer, and the control means controls the fuel supply means so that the tracking performance for fuel quantity actually supplied relative to target fuel supply quantity increases as the quantity of reforming air supplied increases, while on the other hand when water is supplied to the reformer by the water supply means, the fuel supply means is controlled so that the tracking performance for actual fuel supply quantity relative to target fuel supply quantity decreases.

In the present invention thus constituted, water is only intermittently supplied to the reformer by the water supply means, therefore a low-cost water supply means can be used to supply a minute flow of water. Also, in the present invention thus constituted, tracking performance relative to the target fuel supply quantity is improved as the amount of reforming air introduced increases, while on the other hand tracking performance relative to the target fuel supply quantity decreases when water is intermittently supplied to the reformer. The present invention therefore enables increased fuel supply quantity tracking performance and reliable fuel supply when the amount of reforming air introduced into the reformer is large and pressure inside the reformer is high, while on the other hand lowering fuel supply quantity tracking performance and avoiding oversupply of fuel when water is intermittently introduced and pressure suddenly fluctuates.

Use of the solid oxide fuel cell of the present invention permits the size of a reformer to be reduced and an appropriate amount of fuel to be supplied to the reformer.

DETAILED DESCRIPTION OF THE PREFERRED EMBODIMENTS

Embodiments of the Invention

Next, referring to the attached drawings, we discuss a solid oxide fuel cell ("SOFC" or "fuel cell device" below) according to an embodiment of the present invention.

Figure 1:
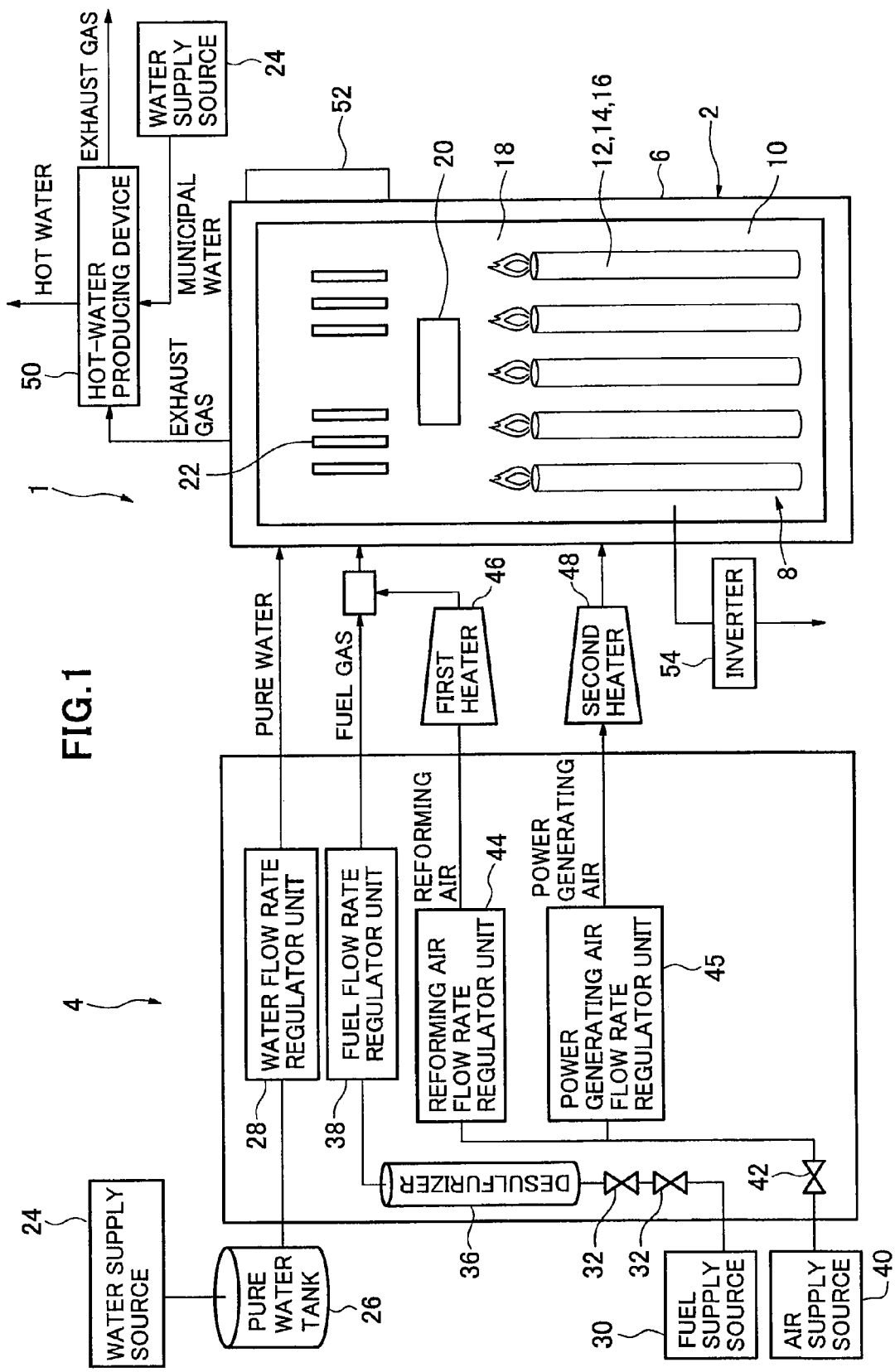
FIG. 1 is an overall schematic showing a fuel cell device according to an embodiment of the present invention.

FIG. 1 is an overall schematic showing an SOFC according to an embodiment of the present invention. As shown in FIG. 1, the SOFC1 according to an embodiment of the present invention comprises a fuel cell module 2 and an auxiliary unit 4.

The fuel cell module 2 is furnished with a housing 6; a sealed space 8 is formed inside the housing 6, mediated by thermal insulation (not shown; note that the thermal insulation is not required in the structure and does not have to be present). Note that it is acceptable not to provide thermal insulation. A fuel cell assembly 12 for carrying out the electrical generating reaction using fuel gas and an oxidant (air) is disposed in the generating chamber 10 at the lower portion of the sealed space 8. The fuel cell assembly 12 comprises 10 fuel-cell stacks 14 (see FIG. 5); these fuel cell stacks 14 are made up of 16 fuel cell units 16 (see FIG. 4). The fuel cell assembly 12 thus has 160 fuel cell units 16, all of which are serially connected.

A combustion chamber 18 is formed above the aforementioned generating chamber 10 in the fuel cell module 2 sealed space 8, and the residual fuel gas and residual oxidant (air) not used in the electrical generation reaction is burned in this combustion chamber 18 to produce exhaust gas. A reformer 20 for reforming fuel gas is disposed at the top of the combustion chamber 18; the reformer 20 is heated by the heat of residual gas combustion to a temperature at which the reforming reaction can take place. An air-heat exchanger 22 for receiving combustion heat and heating the air is further disposed above this reformer 20.

Next, an auxiliary unit 4 is furnished with a pure water tank 26 for storing water from a municipal or other water supply 24 and filtering same to obtain pure water, and a water flow regulator unit 28 (a "water pump" or the like driven by a motor) regulating the flow of water supplied from this reservoir tank. The auxiliary unit 4 is furnished with a gas shutoff valve 32 for shutting off fuel gas supplied from a municipal gas or other fuel supply source 30, a desulfurizer 36 for removing sulfur from the fuel gas, and a fuel flow regulator unit 38 (a "fuel pump" or the like driven by a motor) for regulating the flow of fuel gas. Furthermore, an auxiliary unit 4 is furnished with an electromagnetic valve 42 for shutting off air serving as an oxidizer and supplied from an air supply source 40, and a reforming airflow regulator unit 44 and a generating airflow regulator unit 45 ("air blower" or the like driven by a motor) for regulating airflow quantity. A first heater 46 and a second heater 48 are provided for these to efficiently raise the temperature at the time of startup, but these may be omitted.

Next, a hot-water producing device 50 supplied with exhaust gas is connected to the fuel cell module 2. Municipal water from a water supply source 24 is supplied to this hot-water producing device 50; this water is heated by the heat of the exhaust gas, and is supplied to a hot water reservoir tank in an external water heater, not shown.

A control box 52 for controlling such parameters as the amount of fuel gas supplied is attached to the fuel cell module 2.

An inverter 54 serving as an electrical power extraction unit (electrical power conversion unit) for supplying electrical power generated by the fuel cell module to the outside is further connected to the fuel cell module 2.

Figure 2:
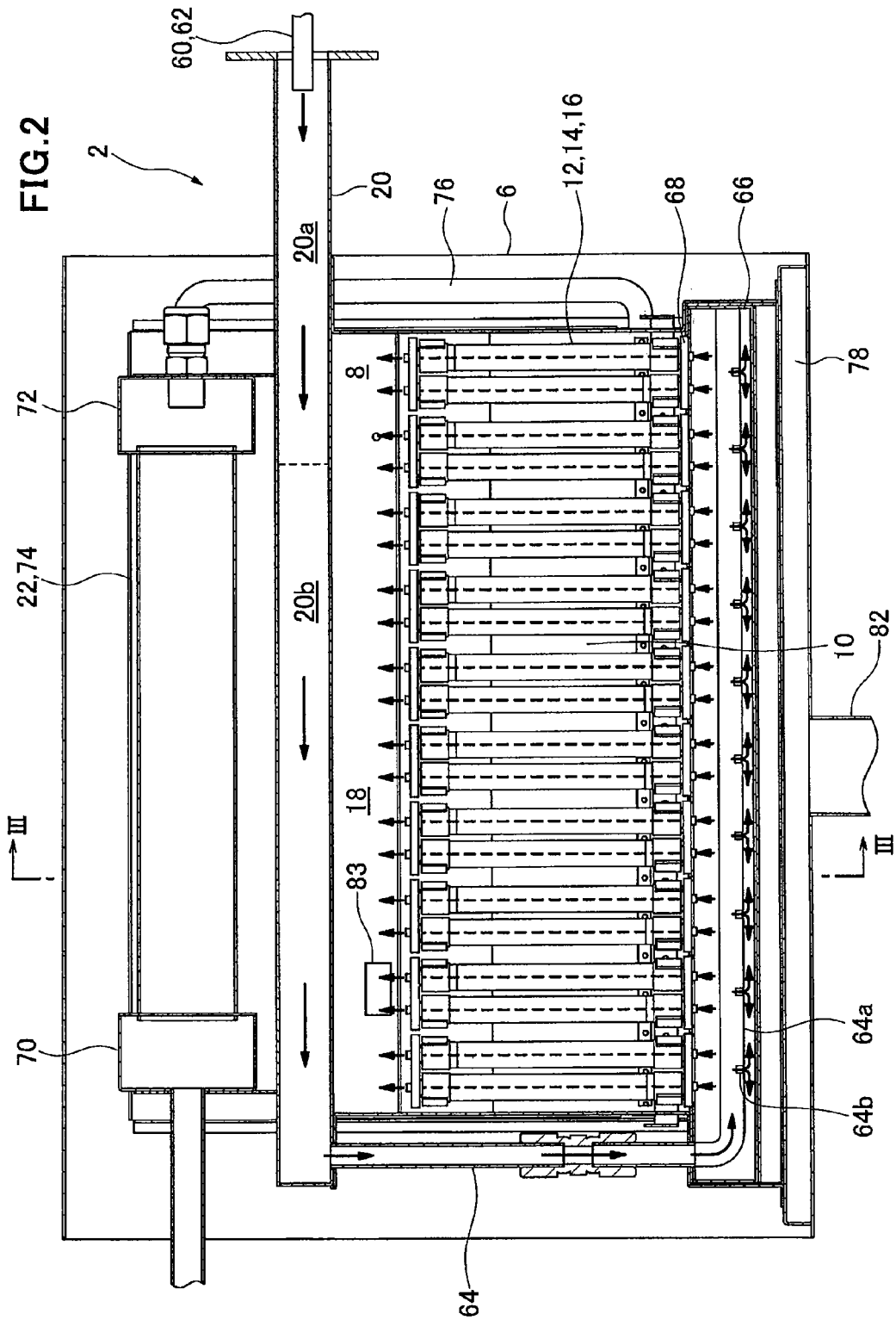
FIG. 2 is a front elevation cross-section showing a fuel cell module in a fuel cell device according to an embodiment of the present invention.
Figure 3:
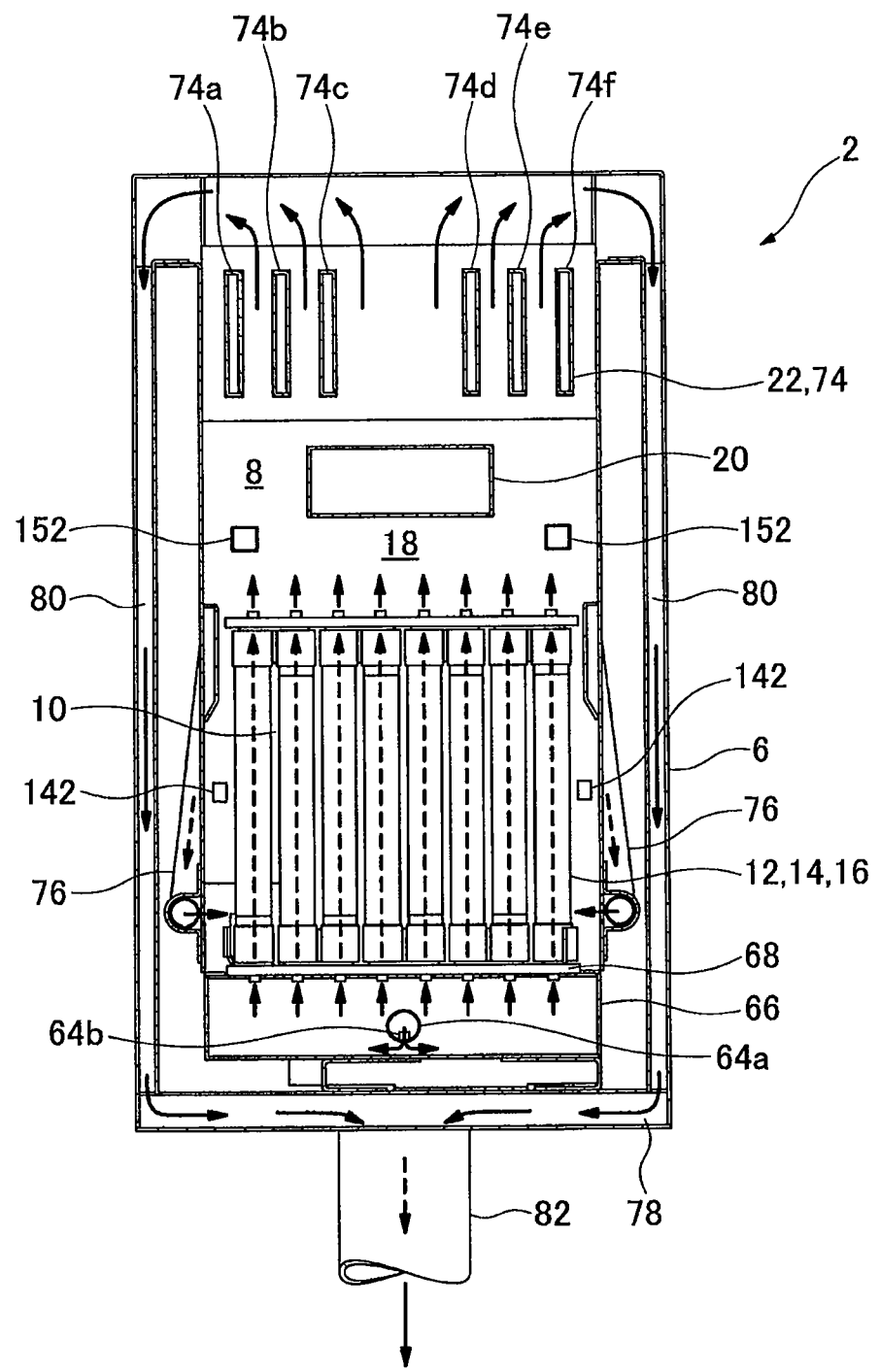
FIG. 3 is a cross-section along line in FIG. 2.

The internal structure of the solid oxide fuel cell (SOFC) of this embodiment of the present invention is next explained using FIGS. 2 and 3. FIG. 2 is a side elevation cross-section showing a SOFC fuel cell module according to an embodiment of the present invention; FIG. 3 is a cross-section along line III-III of FIG. 2.

As shown in FIGS. 2 and 3, a dual cell assembly 12, a reformer 20, and an air-heat exchanger 22 are arranged in sequence starting from the bottom in the sealed space 8 within the fuel cell module 2 housing 6, as described above.

A pure water conduit 60 for introducing pure water on the upstream end of the reformer 20, and a reform gas conduit 62 for introducing the fuel gas and reforming air to be reformed, are attached to the reformer 20; a vaporizing section 20a and a reforming section 20b are formed in sequence starting from the upstream side within the reformer 20, and the reforming section 20b is filled with a reforming catalyst. Fuel gas and air blended with steam (pure water) introduced into the reformer 20 is reformed by the reforming catalyst used to fill the reformer 20. Appropriate reforming catalysts are used, such as those in which nickel is imparted to the surface of aluminum spheres, or ruthenium is imparted to the surface of aluminum spheres.

A fuel gas supply line 64 is connected to the downstream end of the reformer 20; this fuel gas supply line 64 extends downward, then further extends horizontally within a manifold formed under the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

A lower support plate 68 provided with through holes for supporting the above-described fuel cell stack 14 is attached at the top of the manifold 66, and fuel gas in the manifold 66 is supplied into the fuel cell unit 16.

Next, an air-heat exchanger 22 is provided over the reformer 20. This air-heat exchanger 22 is furnished with an air concentration chamber 70 on the upstream side and two air distribution chambers 72 on the downstream side; this air concentration chamber 70 and the distribution chambers 72 are connected using six airflow conduits 74. Here, as shown in FIG. 3, three airflow conduits 74 form a set (74a, 74b, 74c, 74d, 74e, 74f); air in the air concentration chamber 70 flows from each set of the airflow conduits 74 to the respective air distribution chambers 72.

Air flowing in the six airflow conduits 74 of the air-heat exchanger 22 is pre-heated by combustion exhaust gas rising from the combustion chamber 18.

Air conduits 76 are connected to each of the respective air distribution chambers 72; these air conduits 76 extend downward, communicating at the bottom end with the lower space in the generating chamber 10, and introducing preheated air into the generating chamber 10.

Next, an exhaust gas chamber 78 is formed below the manifold 66. As shown in FIG. 3, an exhaust gas conduit 80 extending in the vertical direction is formed on the interiors of the front surface 6a and the rear surface 6b which form the surfaces in the longitudinal direction of the housing 6; the top interior of the exhaust gas conduit 80 communicates with the space in which the air-heat exchanger 22 is disposed, and the bottom end communicates with the exhaust gas chamber 78.

An exhaust gas discharge pipe 82 is connected at approximately the center of the bottom surface of the exhaust gas chamber 78; the downstream end of this exhaust gas discharge pipe 82 is connected to the above-described hot water producing device 50 shown in FIG. 1.

As shown in FIG. 2, an ignition device 83 for starting the combustion of fuel gas and air is disposed on the combustion chamber 18.

Figure 4:
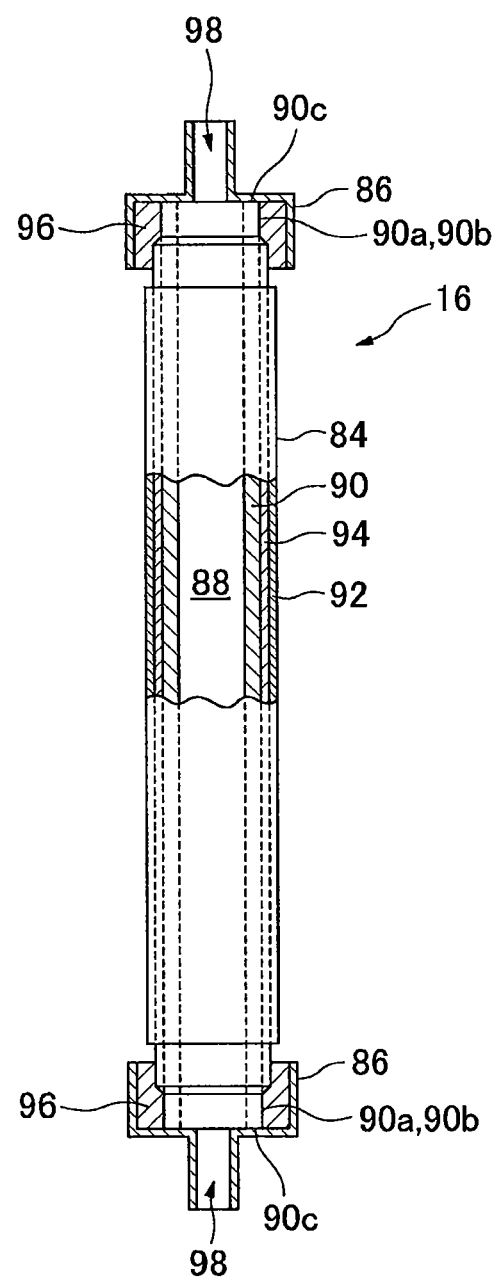
FIG. 4 is a partial cross-section showing a fuel cell device fuel cell unit according to an embodiment of the present invention.

Next, referring to FIG. 4, we discuss the fuel cell unit 16. FIG. 4 is a partial cross-section showing the fuel cell unit in an SOFC according to an embodiment of the present invention.

As shown in FIG. 4, the fuel cell unit 16 is furnished with a fuel cell 84 and internal electrode terminals 86, connected to the respective terminals at the top and bottom of the fuel cell 84.

The fuel cell 84 is a tubular structure extending in the vertical direction, furnished with a cylindrical internal electrode layer 90, on the inside of which is formed a fuel gas flow path 88, a cylindrical external electrode layer 92, and an electrolyte layer 94 between the internal electrode layer 90 and the external electrode layer 92. This internal electrode layer 90 is a fuel electrode through which fuel gas passes, and has a (−) polarity, while the external electrode layer 92 is an air electrode which contacts the air, and has a (+) polarity.

The internal electrode terminals 86 attached at the top and bottom ends of the fuel cell device 16 have the same structure, therefore here we specifically discuss the internal electrode terminal 86 attached at the top and side. The top portion 90a of the inside electrode layer 90 is furnished with an outside perimeter surface 90b and top end surface 90c exposed to the electrolyte layer 94 and the outside electrode layer 92. The inside electrode terminal 86 is connected to the outer perimeter surface of the inside electrode layer 90 through a conductive seal material 96, and is electrically connected to the inside electrode layer 19 through direct contact with the top end surface 90c of the inside electrode layer 90. A fuel gas flow path 98 communicating with the inside electrode layer 90 fuel gas flow path 88 is formed at the center portion of the inside electrode terminal 86.

The inside electrode layer 90 is formed, for example, from at least one of a mixture of Ni and zirconia doped with at least one type of rare earth element selected from among Ca, Y, Sc, or the like; a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; silver, or the like.

Figure 5:
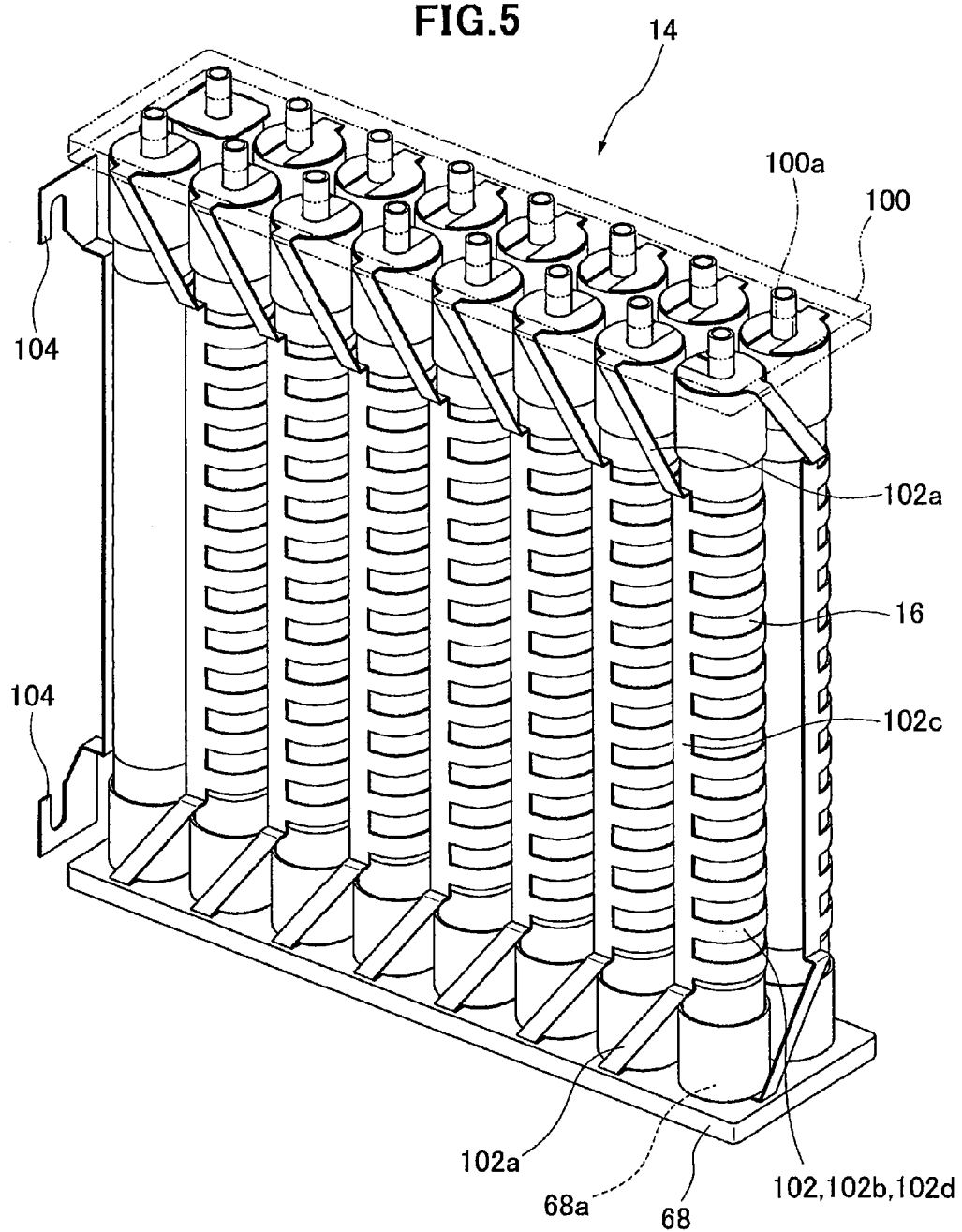
FIG. 5 is a perspective drawing showing a fuel cell device fuel cell stack in an embodiment of the present invention.

Next we discuss the fuel cell stack 14, referring to FIG. 5. FIG. 5 is a perspective view showing a SOFC fuel cell stack according to an embodiment of the present invention.

As shown in FIG. 5, the fuel cell stack 14 is furnished with sixteen fuel cell units 16; the top interior and bottom interior of these fuel cell units 16 are respectively supported by a lower support plate 68 and upper support plate 100. Through holes 68a and 100a, through which the internal electrode 86 can penetrate, are provided on this lower support plate 68 and outer support plate 100.

In addition, a collector 102 and an external terminal 104 are attached to the fuel cell unit 16. This collector 102 is integrally formed from a fuel electrode connecting portion 102a, which is electrically connected to the inside electrode terminal 86 attached to the inside electrode layer 90 serving as the fuel electrode, and an air electrode connecting portion 102b which is electrically connected to the entire external perimeter of the outside electrode layer 92 serving as the air electrode. The air electrode connecting portion 102b is formed of a vertical portion 102c extending vertically along the surface of the outside electrode layer 92, and multiple horizontal portions 102d extending in the horizontal direction from this vertical portion 102c along the surface of the outside electrode layer 92. The fuel electrode connecting portion 102a extends in a straight line in an upward or downward diagonal direction from the vertical portion 102c of the air electrode connecting portion 102b toward the inside electrode terminals 86 positioned in the upper and lower directions on the fuel cell unit 16.

Furthermore, electrode terminals 86 at the top and bottom ends of the two fuel cell units 16 positioned at the end of the fuel cell stack 14 (at the front and back sides on the left edge in FIG. 5) are respectively connected to the outside terminals 104. These external terminals 104 are connected to the external terminals 104 (not shown) at the ends of the adjacent fuel cell stack 14 and, as described above, all of the 160 fuel cell units 16 are connected in series.

Figure 6:
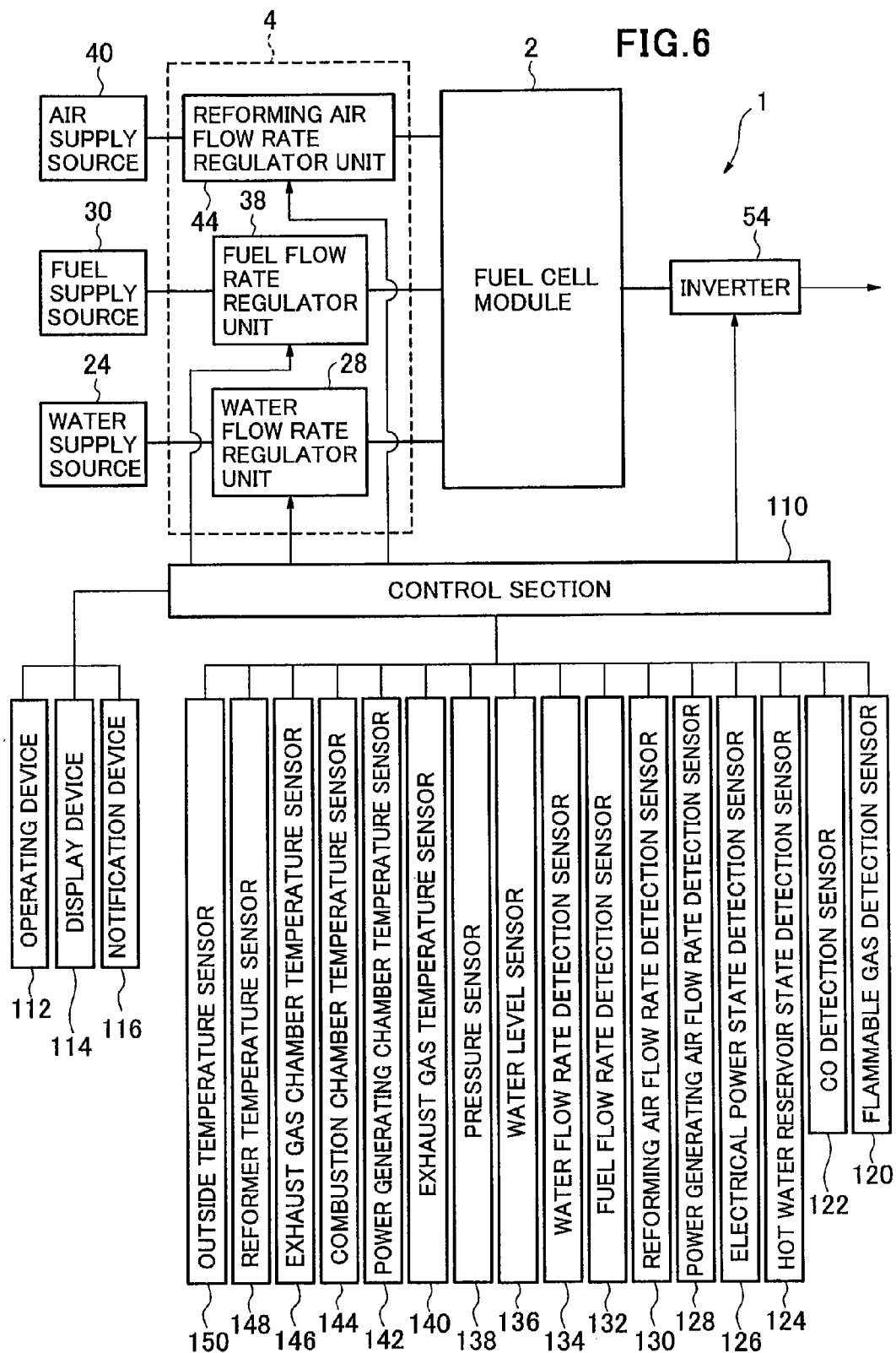
FIG. 6 is a block diagram showing a fuel cell device according to an embodiment of the present invention.

Next, referring to FIG. 6, we discuss sensors and the like attached to an SOFC according to the present embodiment. FIG. 6 is a block diagram showing an SOFC according to an embodiment of the present invention.

As shown in FIG. 6, the fuel cell device 1 is furnished with a control section 110; an operating device 112 provided with operating buttons such as "ON" and "OFF" for user operation, a display device 114 for displaying various data such as a generator output value (watts), and a notification device 116 for issuing alarms during abnormal states and the like are connected to this control section 110. Note that the notification device 116 may be connected to a remote control center to notify the control center of abnormal states.

Next, signals from the various sensors described below are input to the control unit 110.

First, a flammable gas detection sensor 120 detects gas leaks and is attached to the fuel cell module 2 and the auxiliary unit 4.

The purpose of the flammable gas detection sensor 120 is to detect leakage into the external housing (not shown) covering the fuel cell module 2 and the auxiliary unit 4 of CO in the exhaust gas, which is meant to be exhausted to the outside via the exhaust gas conduit 80.

A water reservoir state detection sensor 124 detects the temperature and amount of hot water in a water heater (not shown).

An electrical power state detection sensor 126 detects current, voltage, and the like in the inverter 54 and in a distribution panel (not shown).

A generator airflow detection sensor 128 detects the flow quantity of generator air supplied to the generating chamber 10.

A reforming airflow quantity sensor 130 detects the quantity of reforming airflow supplied to the reformer 20.

A fuel flow quantity sensor 132 serving as a fuel supply quantity detection sensor has the purpose of detecting the flow quantity of fuel gas supplied to the reformer 20.

A water flow quantity sensor 134 detects the flow quantity of pure water (steam) supplied to the reformer 20.

A water level sensor 136 detects the water level in the pure water tank 26.

A pressure sensor 138 detects pressure on the upstream side outside the reformer 20.

An exhaust temperature sensor 140 detects the temperature of exhaust gas flowing into the hot water producing device 50.

As shown in FIG. 3, a generating chamber temperature sensor 142 is disposed on the front and rear surfaces around the fuel cell assembly 12, and detects the temperature around the fuel cell stack 14 in order to estimate the temperature of the fuel cell stack 14 (i.e., of the fuel cell 84 itself).

A combustion chamber temperature sensor 144 detects the temperature in combustion chamber 18.

An exhaust gas chamber temperature sensor 146 detects the temperature of exhaust gases in the exhaust gas chamber.

A reformer temperature sensor 148 detects the temperature of the reformer 20 and calculates the reformer 20 temperature from the intake and exhaust temperatures on the reformer 20.

If the solid oxide fuel cell (SOFC) is placed outdoors, the outside temperature sensor 150 detects the temperature of the outside atmosphere. Sensors to detect outside atmospheric humidity and the like may also be provided.

Signals from these various sensor types are sent to the control unit 110 or control device serving as control means; the control unit 110 sends control signals to the water flow regulator unit 28, the fuel flow regulator unit 38, the reforming air flow regulator unit 44, and the generating air flow regulator unit 45 based on data from the sensors, and controls the flow quantities in each of these units.

The control unit 110 sends control signals to the inverter 54 to control the quantity of electrical power supply.

Figure 7:
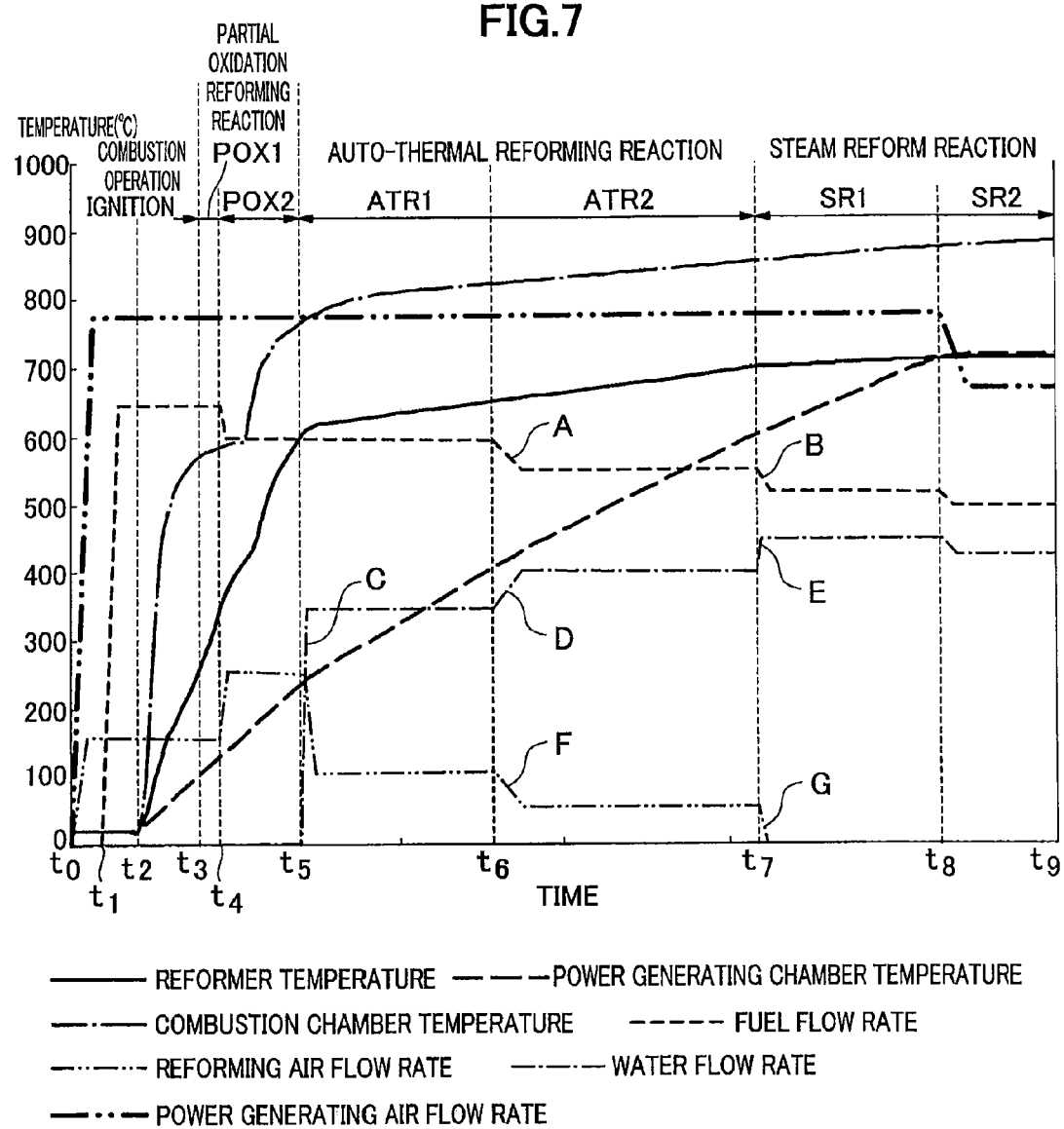
FIG. 7 is a timing chart showing the operation at the time of startup of a fuel cell device according to an embodiment of the present invention.

Next, referring to FIG. 7, we discuss the operation at time of startup of an SOFC according to the present embodiment. FIG. 7 is a timing chart showing operation at the time of startup of an SOFC according to an embodiment of the present invention.

First we discuss a summary of the startup of an SOFC according to the embodiment. At the time startup, the SOFC passes through a combustion operation in which fuel gas is ignited, then a partial oxidation reforming reaction (POX), an auto-thermal reforming reaction (ATR), and a steam reforming reaction (SR); it then transitions to electrical generation.

Here, in the partial oxidation reforming reaction (POX) region, fuel gas and reforming air are supplied to the reformer 20, and a partial oxidation reforming reaction (POX) indicated by Expression (1) proceeds in the reformer 20. This partial oxidation reforming reaction (POX) is an exothermic reaction, and therefore has good starting performance.

$$CmHn + xO_2 \rightarrow aCO_2 + bCO + cH_2 \quad (1)$$

Next, the auto-thermal reforming reaction ATR occurs in a region in which the above-described partial oxidation reforming reaction POX and the steam reforming reaction SR described below are used together, and comprises an auto-thermal reforming reaction ATR1 in which the quantity of water supplied is small, and an auto-thermal reforming reaction ATR2 operated after the ATR1, in which the quantity of water is greater than that in the ATR1. In these ATR1 and ATR2 regions, fuel gas, reforming air, and water are supplied to the reformer 20, and the auto-thermal reforming reactions ATR (ATR1, ATR2) shown in Expression (2) proceed. This auto-thermal reformer ATR is thermally balanced internally, so the reaction proceeds within the reformer 20 in a thermally independent state.

$$CmHn + xO_2 + yH_2O \rightarrow aCO_2 + bCO + cH_2 \quad (2)$$

Next, the steam reforming reaction SR comprises a steam reforming reaction SR1 in which the quantity of fuel gas and water supplied is large, and a steam reforming reaction SR2, which is implemented after the steam reforming reaction SR1, and in which the quantity of fuel gas and water supplied is smaller than in SR1. In these SR1 and SR2 regions, fuel gas and water are supplied to the reformer 20 (the supply of reforming air is stopped), and the steam reforming reaction SR (SR1, SR2) shown in Expression (3) proceeds in the reformer 20. This steam reforming reaction SR is an endothermic reaction, therefore the reaction proceeds while thermally balancing the combustion heat from combustion chamber 18.

$$CmHn + H_2O \rightarrow aCO_2 + bCO + cH_2 \quad (3)$$

Next, referring to FIG. 7, we discuss details of the supply of fuel gas, reforming air, and water in each of the above-described combustion operation, partial oxidation reforming reaction (POX), auto-thermal reforming reaction (ATR), and steam reforming reaction (SR) regions.

At time t0 in FIG. 7, when the solid oxide fuel cell 1 starts, reforming air and generating air are supplied to the fuel cell module 2 by the reforming air flow regulator unit 44 or a reforming air supply device, which serves as a reforming air supply means, and by the generating airflow regulator unit 45, which serves as a generating air supply means.

Note that in the present embodiment, when supply begins at time t0, the quantity of reforming air supplied is 10 L/min, and the quantity of generating air supplied is 100 L/min.

Next, at time t1, the supply of fuel gas to the reformer 20 is commenced by the fuel flow regulator unit 38 or fuel supply device serving as fuel supply means. Fuel and reforming air fed into each of the fuel cell units 16 flow out from the top end of each of the fuel cell units 16. In the present embodiment, the quantity of fuel gas supplied when supply is commenced at time t1 is set at 6 L/min.

In addition, at time t2, fuel flowing out of the fuel cell unit 16 is ignited by the ignition device 83. Fuel is thus combusted in the combustion chamber 18; by this means the reformer 20 disposed over the chamber is heated, and the temperature of the combustion chamber 18, generating chamber 10, and fuel cell stack 14 disposed therein rises (time t2-t3 in FIG. 7). A partial oxidation reforming reaction (POX) occurs inside the reformer 20 (time t3 in FIG. 7) when the temperature of the reformer 20 reaches 300° C. as a result of heating the reformer 20. The partial oxidation reforming reaction is an exothermic reaction, therefore the reformer 20 is also heated by the reaction heat which occurs during the reforming taking place in the partial oxidation reforming reaction.

When the temperature further rises and the reformer 20 reaches 350° C., the fuel supply quantity is reduced and the reforming air supply quantity is increased (time t4 in FIG. 7). This results in a change in the fuel supply quantity to 5 L/min and in the reforming air supply quantity to 18 L/min. These supply quantities are appropriate for causing reforming to occur in the partial oxidation reforming reaction. That is to say, in the initial temperature region at which reforming begins in the partial oxidation reforming reaction, increasing the fuel supply creates a state in which fuel reliably ignites, and also maintains supply quantity and stabilizes ignition (the POX1 region). Furthermore, after stable ignition has occurred and the temperature has risen, fuel waste is suppressed by using the necessary and sufficient fuel supply quantity for generating the partial oxidation reaction (the POX2 region).

Next, at time t5 in FIG. 7, when the reformer 20 reaches a temperature of 600° C. or above and the fuel cell unit 16 temperature reaches 250° C. or above, the quantity of reforming air supplied is reduced and supplying of water by the water flow regulator unit 28 or a water supply device serving as water supply means commences. This results in a change in the reforming air supply quantity to 8 L/min, and in the water supply quantity to 2 cc/min (the ATR1 region). The steam reforming reaction in the reformer 20 is caused by the introduction of water (steam) into the reformer 20. In other words, an auto-thermal reforming reaction (ATR), in which the partial oxidation reforming reaction and the steam reforming reaction are both present, occurs in the ATR1 region.

In addition, the fuel supply quantity is reduced when the reformer 20 temperature reaches 600° C. or above and the fuel cell unit 16 temperature reaches 400° C. or above at time t6 in FIG. 7. Along with reducing the reforming air supply quantity, the water supply quantity is also increased. The fuel supply quantity is thus changed to 4 L/min, the reforming air supply quantity is changed to 4 L/min, and the water supply quantity is changed to 3 cc/min (the ATR2 region). The decrease in reforming air supply quantity and increase in water supply quantity results in a decreased proportion of the partial oxidation reforming reaction and an increased proportion of the steam reforming reaction in the reformer 20.

Next, at time t7 in FIG. 7, the supply of reforming air is stopped when the reformer 20 temperature reaches 650° C. or above and the fuel cell unit 16 temperature reaches 600° C. or above. The water supply quantity is increased as the fuel supply quantity is reduced. This results in the fuel supply quantity changing to 3 L/min and the water supply quantity changing to 8 cc/min (the SR1 region). When the supply of reforming air stops, the partial oxidation reforming reaction ceases to reform in the reformer 20, leaving only the steam reforming reaction (SR).

Furthermore, at time t8 in FIG. 7, when the reformer 20 temperature reaches 650° C. or above and the fuel cell unit 16 temperature reaches 700° C. or above, the fuel supply quantity is reduced, as is the water supply quantity. In addition, the generating air supply quantity is also reduced. This results in a change in fuel supply quantity to 2.3 L/min, in water supply quantity to 6.3 cc/min, and in generating air supply quantity to 80 L/min (the SR2 region).

Thereafter, electrical power is caused to be output from the fuel cell module 2 to the inverter 54, and electrical generation commences (time t9 in FIG. 7). The quantities of fuel supply, generating air supply, and water supply following the start of electrical generation are determined and supplied in accordance with the required electrical power.

Figure 8:
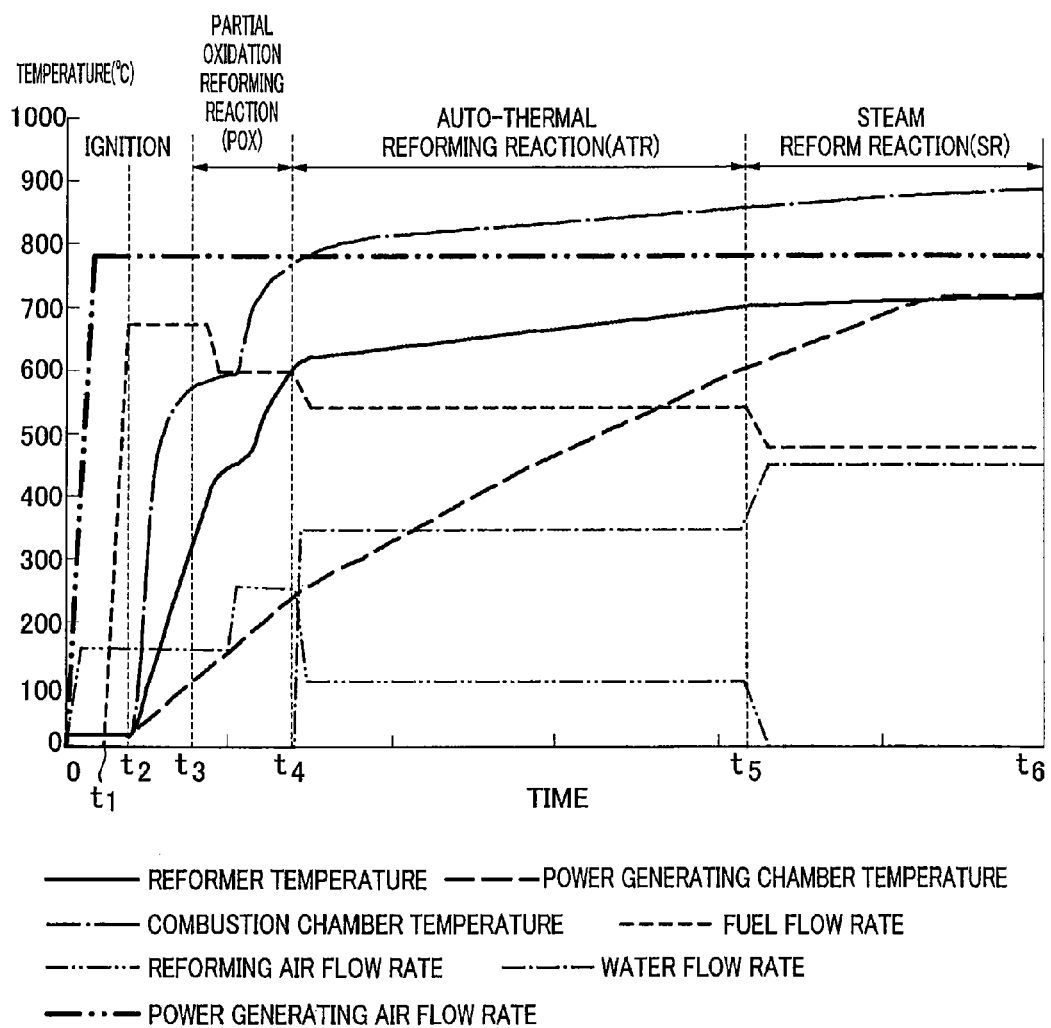
FIG. 8 is a timing chart showing the operation at the time of startup of a fuel cell device according to a variation on an embodiment of the present invention.

Next, referring to FIG. 8, we discuss the operation at the time of startup of an SOFC according to a variation of the present embodiment. FIG. 8 is a timing chart showing the operation timing at startup of an SOFC according to a variation of this embodiment of the present invention.

As shown in FIG. 8, in this variation of the present embodiment the auto-thermal reforming reaction (ATR) does not have the two regions ATR1 and ATR2; in this ATR region a fixed quantity of generating air, fuel, water, and reforming air are respectively supplied without variation to the reformer 20.

The steam reforming reaction (SR) also lacks the two regions SR1 and SR2, and in this SR region a fixed quantity of generating air, fuel, water, and reforming air are respectively supplied without variation to the reformer 20.

Figure 9:
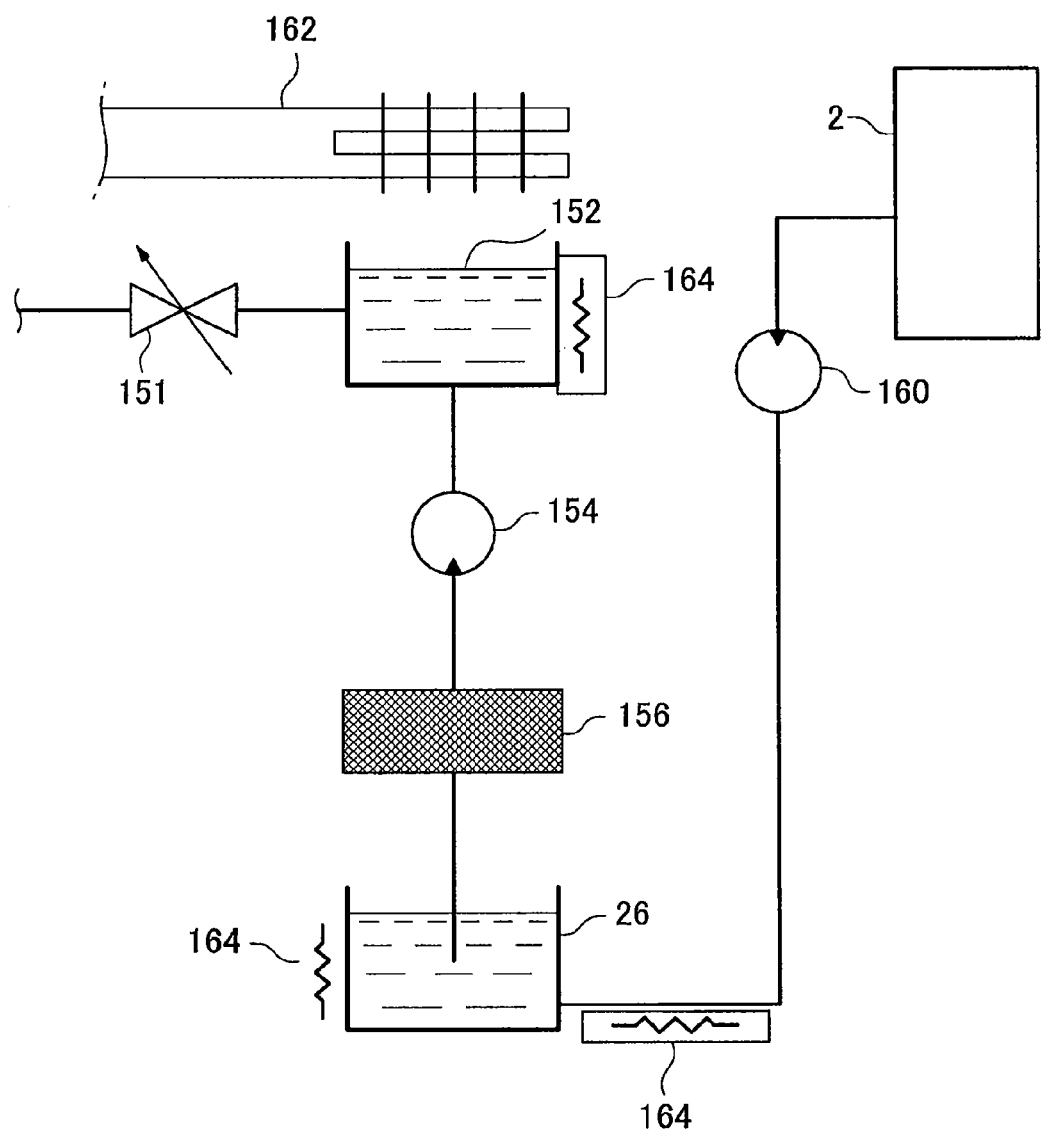
FIG. 9 is a summary drawing showing a water supply device in a fuel cell device according to an embodiment of the present invention.

Next, referring to FIG. 9, we discuss details of a water supply device (water flow regulator unit 28) according to the present embodiment. FIG. 9 is a summary diagram showing a water supply device in an SOFC according to an embodiment of the present invention.

As shown in FIG. 9, the water supply device (water flow regulator unit 28) is furnished with a water tank 152 for temporarily storing municipal water, a pump 154 for supplying water, an RO (reverse osmosis) membrane for purifying this supply of water to produce pure water, a pure water tank 26 for temporarily storing this produced pure water, and a pulse pump 160 for intermittently supplying this pure water to the reformer 20 in the fuel cell module 2 under pulse control. A heat exchanger 162 or heater 164 is also provided to prevent freezing of the water and the pure water.

Figure 10:
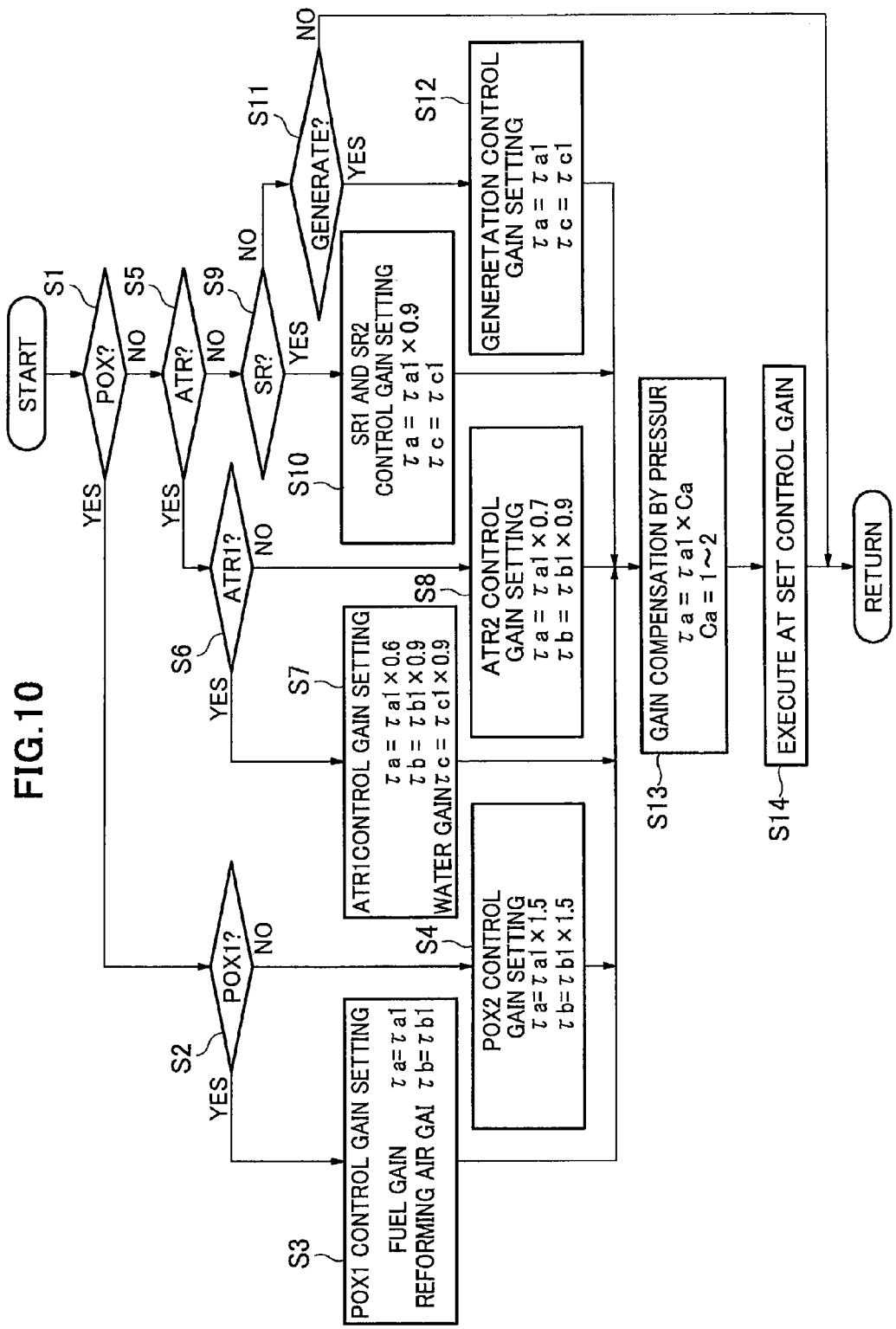
FIG. 10 is a flowchart showing the content of control used to control the supply quantities of fuel, water, and reforming air in a fuel cell device according to an embodiment of the present invention.

Next, referring to FIG. 10, we discuss details of the control of supply quantities of fuel, water, and reforming air in the POX region (POX1 and POX2), the ATR (ATR1 and ATR2) region, the SR (SR1 and SR2) region, and the generating region in the present embodiment. FIG. 10 is a flowchart showing the content of control used to control the supply quantities of fuel, water, and reforming air in a fuel cell device according to an embodiment of the present invention. In FIG. 10, an "S" denotes these steps.

First, at S1 a determination is made as to whether the system is in the POX region at the time of fuel cell device startup. As discussed above, the system is determined to be in the POX region if the temperature of the reformer 20 is at or above 300° C. If it is in the POX region, the system advances to S2; if the temperature of the reformer 20 is at or below 350° C. in S2, the system is in the POX1 region, and therefore advances to S3. The control gain for the ATR1 region is set in S3. With respect to fuel, the fuel flow regulator 38, which serves as fuel supply means, is set to have the same control gain ($\tau a$) as the reference control gain ($\tau a1$) ($\tau a=\tau a1$). With respect to reforming air, the reforming air flow regulator unit 44, which serves as reforming air supply means, is set to have the same control gain $\tau b$ as the reference control gain $\tau b1$ ($\tau b=\tau b1$). Water is not supplied to the reformer 20 in the POX region. Increasing the gain in order to cause the fuel supply quantity and reforming air supply quantity to be respectively tracked as target values increases tracking performance relative to changes in target values, and the speed of return to the target values increases when there is a deviation from the target value. When control gain is reduced, tracking performance relative to changes in the target value is reduced, and changes in the fuel supply quantity and reform air supply quantity become more gradual.

Next, in S2, when there is a determination that the system is not in the POX1 region, the system advances to S4; the control gain in the POX2 region is set in S4. With respect to fuel, the value of the control gain $\tau a$ for the fuel flow regulator unit 38 serving as the fuel supply means is set to rise above the reference control game $\tau a1$ ($\tau a=\tau a1\times1.5$). With respect to reforming air, the value of the control gain $\tau b$ for the reforming air flow regulator unit 44, which serves as reforming air supply means, is set to rise above the reference control gain $\tau b$ ($\tau b=\tau b1\times1.5$).

Next, if a determination is made in S1 that the system is not in the POX region, the system advances to S5 and a determination is made as to whether it is in the ATR region. As described above, if the temperature of the reformer 20 is at or above 600° C., and the temperature of the fuel cell unit 16 (=temperature of the generating chamber) is at or above 250° C. and at or below 600° C., the system is determined to be in the ATR region and advances to S6. In S6, if the temperature of the reformer 20 is at or above 600° C., and the temperature of the fuel cell unit 16 (=temperature of the generating chamber) is at or above 250° C. and at or below 400° C., the system is determined to be in the ATR1 region and advances to S7.

The control gain for the ATR1 region is set in S7. That is, the fuel flow regulator 38, which serves as fuel supply means, is set to have a small control gain value $\tau a$, below that of the reference control gain $\tau a1$ ($\tau a=\tau a1\times0.6$). For reforming air, similarly, the reforming airflow regulator unit 44, which serves as reforming air supply means, is set to have a small control gain value τb, below that of the reference control gain τb1 (τb=τb1×0.9). For water, also, the water flow regulator 28, which serves as water supply means, is set to have a small control gain value τc, below that of the reference control gain τc1 (τc=τc1×0.8). Thus in the ATR1 region, the control gain for fuel is reduced in order to suppress the influence of fuel oversupply and the like arising from pressure fluctuations associated with the water supply; gains other than fuel control gain are also reduced accordingly, and the amount of reduction in the control gain τa, which has the greatest influence, is set to be larger than the amount of reduction in the control gains for reforming air and water.

On the other hand, if a determination is made that the system is not in the ATR1 region, the system proceeds to step S8. In other words, if the temperature of the reformer 20 is at or above 600° C. and the temperature of the fuel cell unit 16 (=generating chamber temperature) is at or above 400° C., the system is not in the ATR1 region but in the ATR2 region, therefore the system advances to S8.

The control gain for the ATR2 region is set in S8. That is, the fuel flow regulator 38, which serves as fuel supply means, is set to have a small control gain value τa, below that of the reference control gain τa1 (τa=τa1×0.7). For reforming air, similarly, the reforming airflow regulator unit 44, which serves as reforming air supply means, is set to have a small control gain value τb, below that of the reference control gain τb1 (τb=τb1×0.9). For water, also, the water flow regulator 28, which serves as water supply means, is set to have a small control gain value τc, below that of the reference control gain τc1 (τc=τc1×0.9). Thus in the ATR2 region, the amount of reduction in the fuel control gain is set to be larger than the amount of reduction in the reforming air and water control gain. The amount of reduction in the fuel control gain and water control gain in the ATR2 region is set to be smaller so as to be moderate relative to the amount of reduction in the fuel control gain in the ATR1 region. This is done in response to the relaxation of the pressure fluctuation factor associated with the increase in the quantity of water supplied.

Next, when it is determined in S5 that the system is not in the ATR region, the system advances to S9, and a determination is made as to whether it is in the SR region. As described above, if the temperature of the reformer 20 is at or above 650° C. and the temperature of the fuel cell unit 16 (=temperature of the generating chamber) is at or below 600° C., the system is in the SR region and therefore advances to S10, where the control gain for the SR1 and SR2 regions is set. With respect to fuel, the fuel flow regulator 38, which serves as fuel supply means, is set to have a small control gain value τa, below that of the reference control gain τa1 (τa=τa1×0.9). With respect to water, the water flow regulator 28, which serves as water supply means, is set to have the same control gain is as the reference control gain τc1 (τc=τc1). Note that reforming air is not supplied in the SR1 and SR2 regions.

Next, if a determination is made in S9 that the system is not in the SR region, it is necessarily in the electrical generation operating region and therefore advances to S11. In S11 a determination is made as to whether the temperature in the generating chamber 10 and the reformer 20 has reached a temperature at which electrical generation is possible. If it has reached a temperature at which electricity can be generated, the system proceeds to S12; at S12 the gain τa of the fuel flow quantity regulator unit 38 serving as fuel supply means is set to the same value as the reference control gain τa1 (τa=τa1). For water, similarly, the water flow regulator 28, which serves as water supply means, is set to have the same control gain τc as the reference control gain τc1 (τc=τc1).

Next, proceeding to S13, the control gain τa set in the above steps S1, S4, S7, S8, S10, or S12 for fuel is compensated using a compensation coefficient Ca (τa=τa×Ca). The compensation coefficient Ca is determined based on the average pressure inside the reformer 20 as detected by the pressure sensor 138 serving as the reformer pressure sensor; in the present embodiment this number is set to be 1 at a 5 kPa pressure inside the reformer, rising in proportion to the rising pressure so that it is 2 at a pressure of 20 kPa.

Next, the system advances to S14; at S14, the fuel flow regulator unit 38, the reforming air regulator unit 44, and the water flow regulator unit 28 are respectively controlled at the set control gain to supply fuel, reforming air, and water to the reformer 20.

Next, referring again to FIG. 7, we discuss the amount of change in the supply quantities (target supply quantities) for fuel, reforming air, and water at the time of transition from the POX region to the ATR region, the time of transition from the ATR region to the SR region, and the like in the present embodiment.

First, the respective fuel supply quantities (target supply quantities) at the time of transition from ATR1 to ATR2 (time t6 in FIG. 7) and at the time of transition from ATR2 to SR1 (time t7 in FIG. 7) are respectively changed so as to decline down to the target supply quantity. The amount of change to the fuel target supply quantity per unit time (target value change gain) is a smaller value at the time of transition from ATR1 to ATR2 than at the time of transition from ATR2 to SR1. Specifically, in FIG. 7 the amount of change per unit time indicated by A is a smaller value than the amount of change per unit time indicated by B (slope is more gradual).

Next, the water supply quantities (target supply quantities) for the time of transition from POX to ATR1 (time t5 in FIG. 7) and for the time of transition from ATR1 to ATR2 (time t6 in FIG. 7) are respectively increased to the target supply quantities. The amount of change (target value change gain) per unit time in the water target supply quantity is a smaller value at the time of transition from ATR1 to ATR2 than at the time of transition from POX to ATR1. Specifically, in FIG. 7 the amount of change per unit time indicated by D is a smaller value than the amount of change per unit time indicated by C (slope is more gradual).

In addition, the water supply quantity (target supply quantity) is changed so as to increase to the target supply quantity at the time of transition from ATR2 to SR1 (time t7 in FIG. 7). The amount of change (target value change gain) per unit time in the water target supply quantity is a smaller value at the time of transition from ATR1 to ATR2 than at the time of transition from ATR2 to SR1. Specifically, in FIG. 7 the amount of change per unit time indicated by D is a smaller value than the amount of change per unit time indicated by E (slope is more gradual).

Next, the reforming air supply quantities (target supply quantities) for the time of transition from ATR1 to ATR2 (time t6 in FIG. 7) and the time of transition from ATR2 to SR1 (time t7 in FIG. 7) are respectively reduced to the target supply quantities. The amount of change to the fuel target supply quantity per unit time (target value change gain) is a smaller value at the time of transition from ATR1 to ATR2 than at the time of transition from ATR2 to SR1. Specifically, in FIG. 7 the amount of change per unit time indicated by F is a smaller value than the amount of change per unit time indicated by G (slope is more gradual).

Figure 11:
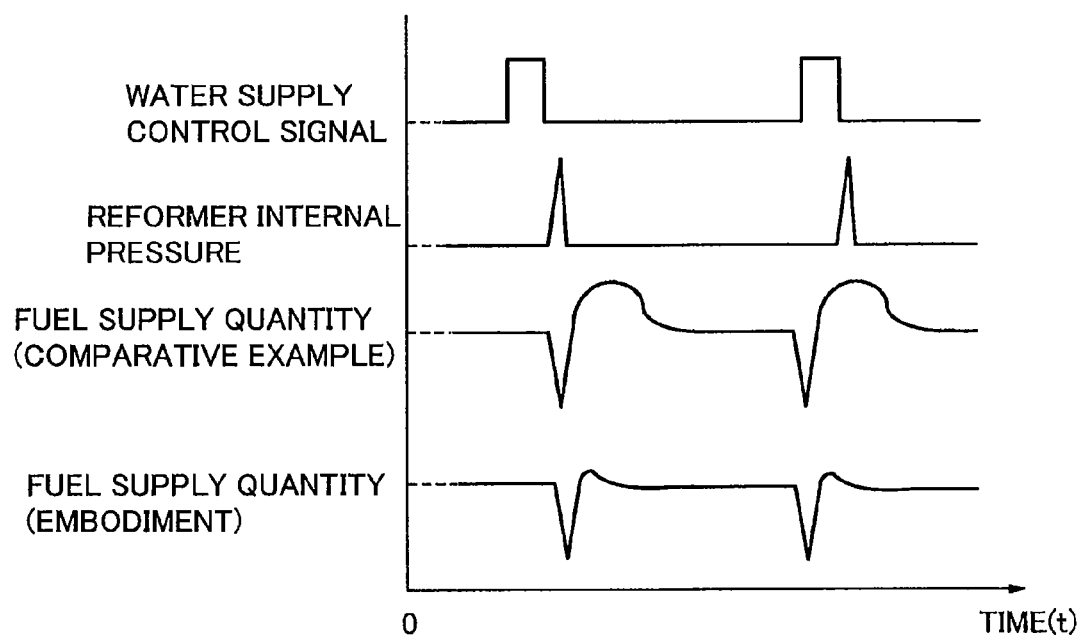
FIG. 11 is a timing chart showing states within the reformer in the ATR region according to an embodiment of the present invention.

Next, referring to FIGS. 7 through 11, we discuss the operation of a fuel cell device according to the embodiment described above. FIG. 11 is a timing chart showing the states, etc., within the reformer in the ATR region according to an embodiment of the present invention.

First, in the ATR region where the supply quantity of water is extremely small, a very expensive specialized pump was conventionally required in order to precisely and stably supply extremely small amounts of water such as several milliliters per minute, but in the present embodiment, as shown in FIG. 10, water is intermittently supplied to the reformer 20 under pulse control using a pulse pump 160 in place of a conventional high cost specialized pump, therefore a simple structure and low-cost pump can be employed, and more easily controlled pulse control is possible.

Next, in the present embodiment, as shown in FIG. 10, the fuel flow regulator 38, which serves as fuel supply means, is set to have a small control gain value $\tau a$, below that of the reference control gain $\tau a1$ ($\tau a=\tau a1 \times 0.6$ and $\tau a=\tau a1 \times 0.7$) in the ATR1 and ATR2 regions. Therefore when fuel is supplied to the reformer 20 in the ATR region, a decline in tracking performance arises in the fuel supply quantity relative to the target supply quantity.

Referring to FIG. 11, we discuss the state within the reformer in the ATR region (ATR1 and ATR2).

First, regarding the supply of water, an extremely small amount of water is intermittently supplied into the reformer 20 by the pulse pump 160 of the water flow regulator unit 28 serving as water supply means, based on a pulse-shaped water supply control signal. This water turns to steam in the reformer, therefore pressure inside the reformer 20 rises immediately after the water is supplied. This rise in pressure inside the reformer makes it difficult to supply fuel into the reformer 20. Therefore in FIG. 11, as shown by the fuel supply quantity (comparative example: use reference control gain) the fuel supply quantity detection sensor detects the state in which the fuel supply quantity is less than the target value when the pressure rises, then immediately judges that fuel is insufficient, and a control is exercised to supply additional fuel. In actuality however, the pressure drops in the next instant, making fuel easier to supply, but since there is an increase by the amount of fuel considered insufficient, notwithstanding the fact that there is actually no such need, the result is an oversupply of fuel gas.

In order to prevent the type of fuel oversupply shown in the fuel supply quantity comparative example, the control gain of the fuel flow regulator unit 38 serving as fuel supply means is reduced in the ATR region, as indicated by the fuel supply quantity in FIG. 11 of the present embodiment, thereby lowering the tracking delay relative to the target supply quantity and preventing the fuel oversupply caused by the rise in pressure inside the reformer immediately after the above-described supplying of water.

Thus, according to the present embodiment, changes in the quantity of fuel supply are suppressed by reducing control gain immediately after water is supplied to the reformer by the pulsed pump 160 (during a predetermined interval) so that fuel oversupply immediately after the supply of water described above is prevented and, as a result, a stable fuel supply and stable auto-thermal reforming reaction are possible in the ATR region even under intermittent control by a simple structure, low-cost pump.

Next, in the present embodiment, as shown in FIG. 10, in the POX1 and POX2 regions in which reforming air is supplied to the reformer 20 the control gain ($\tau a=\tau a1$ and $\tau a=\tau a1 \times 1.5$) of the fuel flow quantity regulator unit 38 serving as the fuel supply means is set to be larger than in the other start up control regions in which reforming air is not being supplied. As a result, in the present embodiment pressure is raised by the introduction of reforming air such that the amount of fuel actually supplied into the reformer 20, where the introduction of fuel has been made more difficult, quickly tracks the target fuel supply quantity so that fuel can be correctly caused to flow into the reformer. At the same time, in the region in which no reforming air is being supplied, tracking performance can be reduced and the oversupply of fuel which accompanies sudden fluctuations in pressure caused by the introduction of water can be avoided by setting the control gain at a low value.

Next, as shown in FIG. 10 of the present embodiment, in the POX2 region in which a large amount of reforming air is supplied to the reformer 20, the control gain ($\tau a=\tau a1 \times 1.5$) of the fuel flow quantity regulator unit 38 serving as fuel supply means is set to be larger than the control gain ($\tau a=\tau a1$) in the POX1 regions in which the supply quantity of reforming air is low. As a result, the present embodiment enables the tracking performance of the fuel supply quantity to be precisely changed in response to the amount of reforming air introduced, thereby more precisely preventing fuel insufficiency or oversupply.

Moreover in the present embodiment, as shown in FIG. 10, the fuel supply quantity control gain is compensated using a compensation coefficient Ca based on the pressure inside the reformer 20 (step S13). As a result, in the present embodiment fuel supply quantity tracking performance improves when the average pressure inside the reformer 20 is high. The average pressure inside the reformer 20 is affected by the amount of reforming air introduced, and by clogging, etc. caused by degradation of the reformer 20. The present embodiment enables the quantity of fuel supplied to be appropriately controlled in response to a rise in pressure within the reformer 20 caused by such factors.

Also in the present embodiment, as shown in FIG. 10, tracking performance relative to the target fuel supply quantity is improved as the amount of reforming air introduced increases (steps S3, S4), while at the same time tracking performance relative to the target fuel supply quantity is decreased in a state whereby water is supplied to the reformer 20 (steps S7, S8, S10). As a result, the present embodiment enables increased fuel supply quantity tracking performance and reliable fuel supply when the amount of reforming air introduced is large and the pressure inside the reformer 20 is high, while at the same time reducing fuel supply quantity tracking performance and avoiding oversupply of fuel when water is introduced and sudden changes in pressure occur.

Next, as shown in FIG. 10, in the ATR region (ATR1 and ATR2) of the present embodiment the control gains $\tau a1$ ($\tau a=\tau a1 \times 0.6$ and $\tau a=\tau a1 \times 0.7$) are set to be lower than those in the POX region ($\tau a=\tau a1$) and the SR region ($\tau a=\tau a1$). As a result, in the present embodiment the control gain for the fuel supply means (fuel flow regulator unit 38) is made lowest in the ATR region compared to that of other regions at the time startup, i.e., the POX region and the SR region; therefore even in the ATR region, where supply of an extremely small amount of water is required, fuel oversupply and control hunting caused by pressure fluctuations arising from the intermittent supply of water into the reformer 20 can be reliably prevented.

Next, as described above, it is believed that by causing the control gain of the fuel supply means (fuel flow regulator unit 38) to be lower in the ATR region than in other regions, the control capability for maintaining fuel supply quantity and accuracy based on the fuel flow quantity sensor 132 is reduced, and as a result control errors arise due to control delays. However, in the present embodiment, as shown in FIG. 8, the supply quantity of air from the reforming airflow regulator unit 44 serving as reforming air supply means, and the supply quantity of water from the water flow regulator unit 28 serving as water supply means are respectively held at fixed quantities and are not changed in the ATR region. As a result, in the ATR region of the present embodiment the supply quantities of air and water which affect the control of the fuel supply quantity are respectively held constant without change, and changes in the fuel supply quantity are to the greatest extent possible prevented from occurring, therefore the occurrence of control problems caused by a reduction in control gain of the fuel supply means (fuel flow regulator unit 38) can be reliably prevented.

Note that in the present embodiment, as shown in FIG. 7, the quantity of air supplied by the reforming airflow regulator unit 44 serving as reforming air supply means, and the quantity of water supplied by the water flow regulator unit 28 serving as water supply means, are similarly held constant without changing in the respective ATR1 and ATR2 regions. Similar results can thus be obtained.

Next, as shown in FIG. 7, in the present embodiment the target supply quantity of water is changed at the time of transition from POX to ATR1 (time t5 in FIG. 7) and at the time of transition from ATR1 to ATR2 (time t6 in FIG. 7); at this point the amount of change in the target supply quantity of water per unit time is smaller during the time of transition from POX to ATR1 than at the time of transition from ATR1 to ATR2. A risk therefore arises in the present embodiment of a fuel supply tracking delay due to the reduction in the fuel supply means (fuel flow regulator unit 38) control gain in the ATR region, particularly when the change in fuel target supply quantity occurs at a time of transition from POX to ATR1, but because the amount of change (target value change gain) per unit time in the target supply quantity of water is reduced from POX to ATR1, tracking delays in the target fuel supply quantity associated with the reduction in the fuel supply means (fuel flow regulator unit 38) control gain can be reliably prevented.

Next, as shown in FIG. 7, in the present embodiment the target supply quantities for fuel, air, and water are respectively changed for the time of transition from ATR1 to ATR2 (time t6 in FIG. 7) and the time of transition from ATR2 to SR (time t7 in FIG. 7), while the amount of change per unit time in the target supply quantities of fuel, air, and water at the time of transition from ATR1 to ATR2 and the time of transition from ATR2 to SR are reduced, and the amount of change per unit time in each of those target supply quantities is made smaller for the time of transition from ATR1 to ATR2 than for the time of transition from ATR2 to SR.

Therefore as shown in FIG. 7, more water is supplied at the time of transition from ATR2 to SR than at the time of transition from ATR1 to ATR2, thereby making more frequent the timing of the water supply intervals such that pressure fluctuations in the reformer 20 are alleviated and pressure is stabilized at a high level so that the problem of fuel oversupply associated with pressure fluctuations can be alleviated. Thus in the present embodiment, the fuel supply means (fuel flow regulator unit 38) control gain is reduced, and the amount of change per unit time in the target supply quantity (target value change gain) is made smaller for the time of transition from ATR1 to ATR2 than for the time of transition from ATR2 to SR, so that the problems of fuel oversupply and hunting associated with pressure fluctuations, as well as the problem of tracking delays relative to target fuel supply quantities, can be skillfully balanced at a high level and resolved.

Next, as shown in FIG. 10, in the present embodiment the amount of reduction in the fuel supply means (fuel flow regulator unit 38) control gain in the ATR2 region is set to be smaller than the amount of reduction in the control gain in the ATR1 region. Here, as shown in FIG. 7, more water is supplied in the ATR2 region than in the ATR1 region, resulting in a shorter intermittent water supply interval, thus stabilizing pressure in a high-pressure state and alleviating the fuel oversupply problem associated with pressure fluctuations. Therefore in the present embodiment, by reducing the amount of reduction in the control gain of the fuel supply means (fuel flow regulator unit 38) more in the ATR2 region than in the ATR1 region, fuel oversupply and reduced tracking performance relative to the target fuel value can be suppressed and tracking delays can be simultaneously alleviated.

Next, as shown in FIG. 10, in the present embodiment the fuel supply means (fuel flow regulator unit 38) control gain for the ATR region and the SR region is reduced below that of the POX region, and the amount of reduction in the fuel supply means control gain in the SR region is made smaller than the amount of reduction in the control gain in the ATR region. As shown in FIG. 7, more water is supplied in the SR region than in the ATR region, resulting in a shorter intermittent water supply interval, thus stabilizing pressure in a high-pressure state so that oversupply of fuel caused by pressure fluctuations can be alleviated. Therefore in the present embodiment, by making the reduction in the fuel supply means (fuel flow regulator 38) control gain smaller in the SR region than the control gain reduction in the ATR region, fuel oversupply associated with pressure fluctuations can be suppressed, while at the same time the opposite problem of target fuel supply quantity tracking delay can also be resolved a high level.

Next, as shown in FIG. 10, in the present embodiment the reforming air supply means (reforming airflow regulator unit 38) control gain is made smaller in the ATR region than in the POX region. Here, as with the fuel supply means (fuel flow regulator unit 38) control gain, the reforming air supply means (reforming airflow regulator unit 38) control gain is reduced in the ATR region, therefore the oversupply of air caused by pressure fluctuations arising from intermittent supply of water into the reformer can be prevented.

Next, as shown in FIG. 10, the amount of reduction in the fuel supply means (fuel flow regulator unit 38) control gain is made larger in the ATR region than the amount of reduction in the reforming air supply means (reforming airflow regulator unit 44) control gain. Here the quantity of reforming air supplied into the reformer fluctuates with the quantity of fuel supplied, due to pressure fluctuations in the reformer associated with the intermittent water supply. Therefore in the present embodiment, because the reforming air supply means (reforming airflow regulator unit 44) control gain is also reduced, oversupply of air and control gain hunting can be even more reliably prevented. The quantity of reforming air supplied is also extremely large compared to the quantity of fuel supplied, therefore reforming air is less influenced by pressure fluctuations caused by the vaporization of water. Hence in the present embodiment the amount of reduction in the reforming air supply means (reforming airflow regulator unit 44) control gain is made smaller than the amount of reduction in the fuel supply means (fuel flow regulator unit 38) control gain, and unnecessary tracking delays relative to the target reforming air supply quantity can be reliably prevented.

Note that in the present embodiment the control gains for fuel, water, and air are independently varied, but it would also be acceptable to vary only the fuel supply quantity control gain based on the flow of water, air pressure, or the like. Control can thus be simplified and stabilized.

What is claimed is:

1. A solid oxide fuel cell system for generating electricity using air and reformed fuel comprising:
    a reformer that reforms fuel;
    a fuel supply device that supplies the fuel to the reformer;
    a reforming air supply device that supplies reforming air to the reformer;
    a water supply device that supplies water to the reformer;
    a fuel supply quantity sensor that detects an actual quantity of fuel being supplied to the reformer by the fuel supply device;
    a fuel cell module that generates electricity using the reformed fuel; and
    a control device programed to control the fuel supply device, the reforming air supply device, and the water supply device so that target quantities of fuel, reforming air, and water are supplied into the reformer;
    wherein the control device is programed to control the fuel supply device so that the actual quantity of fuel being supplied, which is detected by the fuel supply quantity sensor, matches the target quantity of fuel supply, and the controller is programed to control the fuel supply device, while the reforming air supply device is supplying the reforming air to the reformer, so that the actual quantity of fuel being supplied tracks the target quantity of fuel supply more rapidly as a quantity of reforming air being supplied to the reformer increases.

2. The solid oxide fuel cell of claim 1, further comprising a reformer pressure sensor that measures pressure inside the reformer, wherein the control device is programed to control the fuel supply device so that the actual quantity of fuel being supplied tracks the target amount of fuel supply more rapidly as an average of the internal pressure within the reformer measured by the reformer pressure sensor rises.

3. The solid oxide fuel cell of claim 1, wherein the water supply device is operable to supply water intermittently to the reformer, and the control device is programed to control the fuel supply device, while the water supply device is supplying water to the reformer, so that the actual quantify of fuel being supplied tracks the target quantify of fuel supply more slowly than when the water supply device is not supplying water to the reformer.

* * * * *